Figure 1:
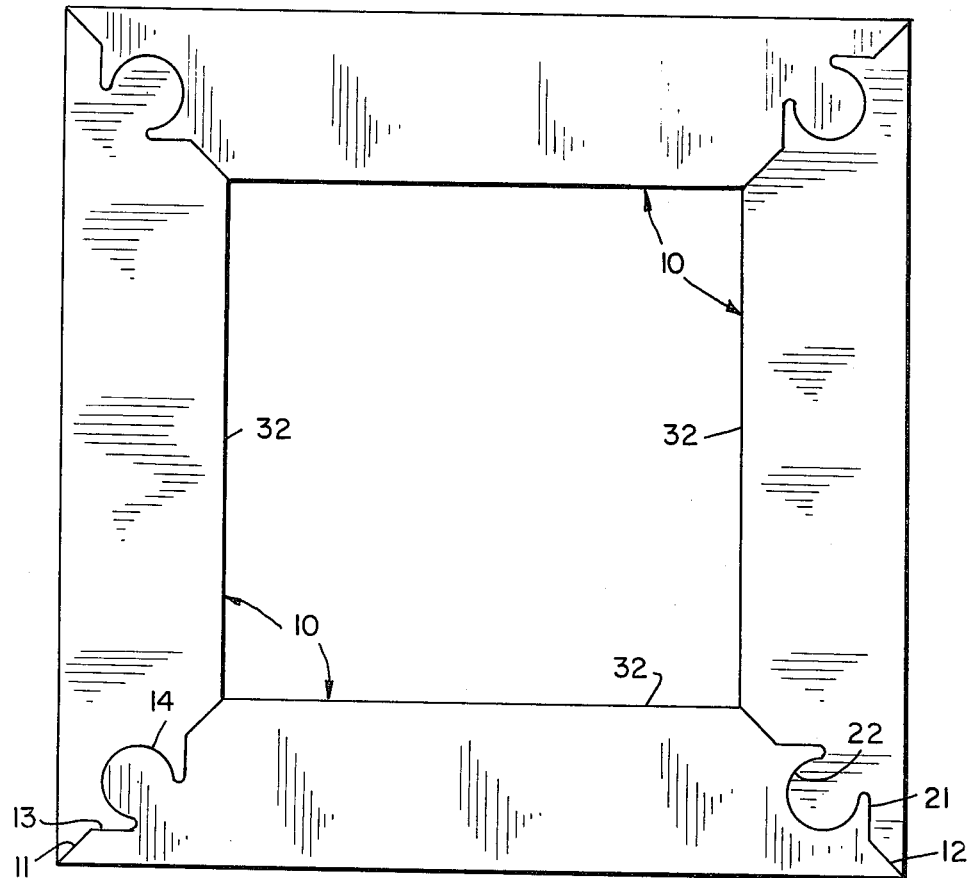

United States Patent [19]

Mackenroth

[11] 4,099,887

[45] Jul. 11, 1978

[54] STRUCTURAL JOINTS

[76] Inventor: Einhard Mackenroth, Lower Salem La., South Salem, N.Y. 10590

[21] Appl. No.: 816,391

[22] Filed: Jul. 18, 1977

[51] Int. Cl.² .................. F16D 1/00; F16L 25/00
[52] U.S. Cl. .................................. 403/4; 403/331;
    403/381; 40/155; 46/28; 52/574; D6/242;
    D6/246
[58] Field of Search .............. 403/3, 4, 331, 381,
    403/354, 364, 401; 52/574, 594; 46/25, 28;
    40/155; D6/242, 246

[56] References Cited

U.S. PATENT DOCUMENTS

| | | | |
|---|---|---|---|
| 2,031,194 | 2/1936 | Thompson | 46/25 X |
| 2,077,582 | 4/1937 | Peo | 403/37 |
| 2,406,759 | 9/1946 | Glukes | 46/25 |
| 2,619,574 | 11/1952 | Lambert | 403/401 X |
| 3,489,987 | 1/1970 | Niskin | 403/364 X |
| 3,722,704 | 3/1973 | Piretti | 52/594 X |
| 3,757,445 | 9/1973 | Stillwell | 40/155 X |
| 3,992,834 | 9/1976 | Valenzano | 52/594 X |

Primary Examiner—Wayne L. Shedd
Attorney, Agent, or Firm—Marn & Jangarathis

[57] ABSTRACT

A first structural member having a portion beveled at an angle of 45° which includes a mortise in the form of a generally cylindrical groove is joined to a second structural member having a portion beveled at an angle of 45° which includes a tenon in the form of a generally cylindrical rib, with the beveled portions in an abutting relationship by a joint formed by the rib being snugly fitted in the groove. The members may be joined at a straight angle or at a right angle, and may be employed for producing modular structural frames; articles of furniture; modular toy constructions; wall attachments; flooring boards and other arrangements wherein the flexibility of straight angle and right angle permutations of interlocking members of standardized elongated configurations are utilized.

6 Claims, 2 Drawing Figures

U.S. Patent     July 11, 1978     4,099,887

STRUCTURAL JOINTS

This invention relates to a joint between two members. This invention further relates to a structural member which can be joined to another structural member at either a right angle or a straight angle.

In accordance with the present invention, there is provided a joint between a pair of structural members, with the pair of members each having a portion beveled at an angle of about 45°. The beveled portion of one structural member includes a mortise in the form of a generally cylindrical groove, and the beveled portion of the second structural member includes a tenon in the form of a generally cylindrical rib, with the beveled portions of the members being joined together in an abutting relationship by a joint formed by the rib being snugly fitted in the groove.

The structural members may be joined at a right angle, in which case the beveled portions are placed in abutment with each other with the rib snugly fitted in the groove with the outermost portion of the bevel of one structural member mating with the outermost portion of the bevel of the other member, or the members may be joined at a straight angle (180°) in which case the beveled portions are placed in abutment with each other with the rib being snugly fitted in the groove with the outermost portion of the bevel of one block mating with the innermost portion of the bevel of the other block.

The preferred form of the structural member has opposite ends beveled in opposite directions at an angle of 45°, with one end including the generally cylindrical rib, and the other end the generally cylindrical groove. It is to be understood, however, that the block could be made with only one beveled end, which includes either a groove or a rib, or with a pair of beveled ends, with both ends including a rib or both ends including a groove.

Figure 2:
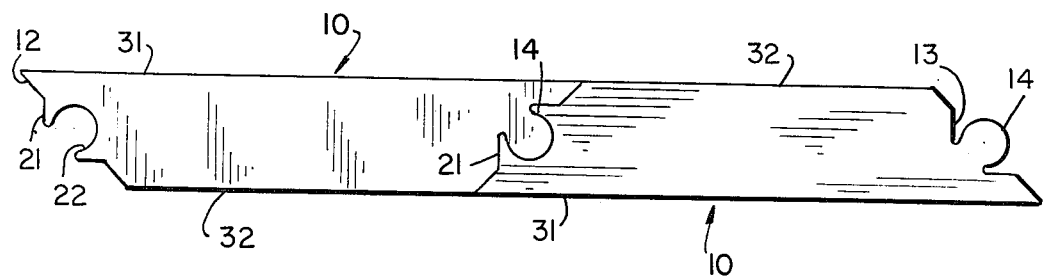

The invention will be further described with respect to the accompanying drawings wherein:

FIG. 1 illustrates an embodiment of the invention in which a plurality of structural members are joined at right angles; and FIG. 2 illustrates another embodiment of the invention wherein structural members are joined at a straight angle.

Referring now to FIG. 1 of the drawing, there is shown four structural members 10, joined at right angles to each other. Each member 10 has opposite ends 11 and 12 beveled in opposite directions at an angle of 45°, and opposite long and short sides 31 and 32, respectively. Beveled end 11 includes a recessed portion 13, which includes a tenon in the form of a generally cylindrical longitudinal rib 14 having a circular cross section. The rib 14 extends outwardly from the recessed portion 13 beyond the plane of the beveled end 11, preferably as shown, a distance whereby the plane of the beveled end 11 passes through the axis of the cylindrical rib 14.

Beveled end 12 of structural member 10 includes a projecting portion 21, which includes a mortise in the form of a generally cylindrical longitudinal open slot or groove 22 having a generally circular cross section. The groove 22 of the projecting portion 21 extends inwardly from the plane of the beveled end 12, preferably as shown, a distance whereby the plane of the beveled end 12 extends through the axis of the cylindrical groove 22.

The groove 22, rib 14, recessed portion 13 and projecting portion 21 are sized and positioned such that the rib 14 of one member 10 can be snugly slidably inserted into the groove 22 of another member 10, with the beveled ends 12 and 11 including the respective projecting and recessed portions 21 and 13 being in abuttment with each other. The rib 14 of one member 10 by fitting snugly within the groove 22 of another member 10 forms a joint between the respective members. As shown in FIG. 1, a right angle joint is formed between a pair of members 10 by positioning the short side 32 of one member 10 adjacent to the short side 32 of a second member 10, whereby the innermost and outermost portions of the beveled ends 11 and 12 of each member mate with each other.

A straight angle (180°) joint between the members can be formed (FIG. 2) by placing the short side 32 of one member adjacent to the long side 31 of a second member, whereby the outermost portions of the beveled ends 11 and 12 mate with the innermost portions of the beveled ends 11 and 12.

Although the present invention has been particularly described with respect to structural members which have integral beveled ends, it is to be understood that the beveled ends can be separately made, for example, of metallic extrusions and affixing same to wood blocks or other structures to be interconnected.

Similarly, although the invention has been particularly described with respect to structural members having a pair of beveled ends, each member could have a single beveled end. Similarly, the members could have a pair of beveled ends in which both ends have a tenon, or both ends have a mortise.

Similarly, although the members are preferably produced in a manner such that the ends of the members are beveled over the entire length thereof, with the tenon or mortise also extending over the length thereof, the blocks could be formed with only portions or several spaced portions thereof including the tenon or mortise.

The structural members may be formed by any suitable material, such as concrete, hard wood, plastic, steel, etc. The members may be employed for producing a wide variety of structures, with such structures being easily assembled by slidably inserting the ribs in the grooves. For example, the members may be assembled into modular frames such as the right angle column, shown in FIG. 1, and hard wood flooring, such as the straight angle assemblage of FIG. 2.

The present invention also offers the advantage that a single member is capable of being joined to another block at either a right angle or a straight angle.

Numerous modifications and variations of the present invention are possible in light of the above teachings and, therefore, within the scope of the appended claims, the invention may be practiced otherwise than as particularly described.

I claim:

1. An article of manufacture, comprising:
   first and second members, said first member having a portion beveled at an angle of 45°, said second member having a portion beveled at an angle of 45°, said beveled portion of the first member including a recessed portion, said recessed portion including a cylindrical rib which extends outwardly beyond the plane of the beveled portion of the first member, said beveled portion of the second member including a projecting portion, said projecting portion including an open cylindrical groove which extends inwardly beyond the plane of the beveled portion of the second member, said first and second members being joined together at the beveled portions by a joint of said rib being fitted in said groove.

2. The article of claim 1 wherein the plane of the beveled portion of the first member passes through the axis of the cylindrical rib and the plane of the beveled portion of the second member passes through the axis of the cylindrical groove.

3. The article of claim 1 wherein said first and second members are joined together to form a right angle with the outermost portions and the innermost portions of said beveled portions mating with each other.

4. The article of claim 1 wherein the members are joined together to form a 180° angle, with the outermost portion of the beveled portion of each member mating with the innermost portion of the beveled portion of each member.

5. An article of manufacture, comprising:

a member having first and second opposite ends having beveled portions at an angle of 45°, said beveled portion of the first end extending in a direction opposite to the beveled portion of the second end to form long and short sides on said member, said beveled portion of said first end including a recessed portion, said recessed portion including a cylindrical rib which extends outwardly beyond the plane of the beveled portion of the first end, said beveled portion of said second end including a projecting portion, said projecting portion including a cylindrical open groove which extends inwardly from the plane of the beveled portion of said second end, said cylindrical rib and cylindrical groove being sized whereby the cylindrical rib snugly fits within the cylindrical groove of another such member.

6. The article of claim 5 wherein the plane of the beveled portion of the first end passes through the axis of the cylindrical rib and the plane of the beveled portion of the second end passes through the axis of the cylindrical groove.

* * * * *